United States Patent
Cheung et al.

(10) Patent No.: US 10,024,538 B2
(45) Date of Patent: Jul. 17, 2018

(54) APPARATUS AND METHOD FOR AIR EXTRACTION AT A GAS TURBINE ENGINE COMBUSTOR

(71) Applicant: United Technologies Corporation, Farmington, CT (US)

(72) Inventors: Albert K. Cheung, East Hampton, CT (US); Christos Adamopoulos, Colchester, CT (US); Christopher B. Lyons, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 350 days.

(21) Appl. No.: 14/836,117

(22) Filed: Aug. 26, 2015

(65) Prior Publication Data

US 2017/0059161 A1    Mar. 2, 2017

(51) Int. Cl.
*F23R 3/02* (2006.01)
*F23R 3/16* (2006.01)
(Continued)

(52) U.S. Cl.
CPC .................. *F23R 3/16* (2013.01); *F02C 6/06* (2013.01); *F02C 7/12* (2013.01); *F02C 7/18* (2013.01); *F23C 9/08* (2013.01); *F23R 3/002* (2013.01); *F23R 3/02* (2013.01); *F23R 3/04* (2013.01); *F23R 3/42* (2013.01); *F23R 3/425* (2013.01); *F02C 6/08* (2013.01); *F02C 9/18* (2013.01); *F05D 2220/32* (2013.01);
(Continued)

(58) Field of Classification Search
CPC ...... F02C 6/06; F02C 6/08; F02C 7/12; F02C 7/18; F02C 9/18; F05D 2240/35; F23C 9/08; F23C 2900/09001; F23R 3/002; F23R 3/007; F23R 3/02; F23R 3/04; F23R 3/16; F23R 3/42–3/58
See application file for complete search history.

(56) References Cited

U.S. PATENT DOCUMENTS 3,777,489 A * 12/1973 Johnson .................. F01D 9/065
                                                    415/144
4,730,978 A *  3/1988 Baran, Jr. ............. F01D 5/3015
                                                    415/115
(Continued)

FOREIGN PATENT DOCUMENTS

EP   2511496 A2   10/2012
GB   1239366 A  *  7/1971 .............. F02C 7/185
GB   2342693 A    4/2000

OTHER PUBLICATIONS

European Search Report; International Application No. 16176035.0; International Filing Date: Jun. 23, 2016; dated Feb. 2, 2017; 7 pages.

*Primary Examiner* — Gerald L Sung
*Assistant Examiner* — Scott Walthour
(74) *Attorney, Agent, or Firm* — Cantor Colburn LLP

(57) ABSTRACT

An air extraction port at a combustor of a gas turbine engine includes a port inlet at a combustor case of the combustor having an inlet area, a port outlet having a final area, and a fluid passage extending from the port inlet to the port outlet to convey an airflow, the port inlet sized and configured to extract the airflow from the combustor case at the same nominal upstream Mach number with a tolerance of +/−0.05.

14 Claims, 4 Drawing Sheets

(51) Int. Cl.

| | | |
|---|---|---|
| *F02C 7/18* | (2006.01) | |
| *F23R 3/00* | (2006.01) | |
| *F23R 3/42* | (2006.01) | |
| *F02C 6/06* | (2006.01) | |
| *F02C 7/12* | (2006.01) | |
| *F23R 3/04* | (2006.01) | |
| *F23C 9/08* | (2006.01) | |
| *F23R 3/58* | (2006.01) | |
| *F23R 3/46* | (2006.01) | |
| *F23R 3/52* | (2006.01) | |
| *F23R 3/56* | (2006.01) | |
| *F23R 3/54* | (2006.01) | |
| *F23R 3/50* | (2006.01) | |
| *F23R 3/48* | (2006.01) | |
| *F02C 6/08* | (2006.01) | |
| *F02C 9/18* | (2006.01) | |
| *F23R 3/44* | (2006.01) | |

(52) U.S. Cl.
CPC ...... *F05D 2240/35* (2013.01); *F05D 2260/20* (2013.01); *F23C 2900/09001* (2013.01); *F23R 3/44* (2013.01); *F23R 3/46* (2013.01); *F23R 3/48* (2013.01); *F23R 3/50* (2013.01); *F23R 3/52* (2013.01); *F23R 3/54* (2013.01); *F23R 3/56* (2013.01); *F23R 3/58* (2013.01)

(56) References Cited

U.S. PATENT DOCUMENTS

| | | | | |
|---|---|---|---|---|
| 5,048,288 | A * | 9/1991 | Bessette | F01D 11/24 415/116 |
| 5,113,648 | A * | 5/1992 | Shekleton | F23R 3/06 60/39.091 |
| 5,211,003 | A * | 5/1993 | Samuel | F01D 9/065 60/751 |
| 5,394,687 | A * | 3/1995 | Chen | F01D 9/02 60/785 |
| 5,619,855 | A | 4/1997 | Burrus | |
| 5,791,148 | A * | 8/1998 | Burrus | F01D 5/18 60/749 |
| 2005/0210882 | A1* | 9/2005 | Winstanley | F02C 6/08 60/785 |
| 2009/0320496 | A1* | 12/2009 | Faulder | F01D 25/305 60/785 |
| 2013/0199205 | A1* | 8/2013 | Wang | F02C 6/08 60/785 |
| 2015/0033749 | A1 | 2/2015 | Slobodyanskiy et al. | |

* cited by examiner

APPARATUS AND METHOD FOR AIR EXTRACTION AT A GAS TURBINE ENGINE COMBUSTOR

BACKGROUND

This disclosure relates to gas turbine engines, and more particularly to combustor air extraction ports for gas turbine engines.

Gas turbines hot section components, in particular turbine vanes and blades in the turbine section of the gas turbine are configured for use within particular temperature ranges. Such components often utilize a cooling airflow, or cooling film over exterior surfaces of the components and/or cooling airflow through interior sections of the components to aide in maintaining the temperature at the component within the particular temperature range. The cooling airflow is often diverted from another part of the gas turbine engine, such as a compressor section or from the diffuser case upstream of the combustor. In some gas turbine engines, however, available space prevents extraction of air from these locations, thus airflow is extracted from the combustor. Extraction from the combustor section, however, may result in a nonuniform pressure field in the combustor, which is undesirable. Thus, air extraction from the combustor is desired that retains uniformity of the pressure field.

BRIEF DESCRIPTION

According to one embodiment, an air extraction port at a combustor of a gas turbine engine is provided. The air extraction port includes a port inlet at a combustor case of the combustor having an inlet area, a port outlet having a final area, and a fluid passage extending from the port inlet to the port outlet to convey an airflow, the port inlet sized and configured to extract the airflow from the combustor case at the same nominal upstream Mach number with a tolerance of +/−0.05.

In addition to one or more of the features described above, or as an alternative, further embodiments may include that the inlet area is greater than or equal to the final area.

In addition to one or more of the features described above, or as an alternative, further embodiments may include that a ratio of the inlet area to the final area is between 1.0 and 1.6.

In addition to one or more of the features described above, or as an alternative, further embodiments may include that wherein a taper from the inlet area to the final area occurs over a passage length proportional to an inlet hydraulic diameter of the port inlet, wherein a ratio of the passage length to the inlet hydraulic diameter is equal to or greater than 4.

In addition to one or more of the features described above, or as an alternative, further embodiments may include that the ratio of the passage length to the inlet hydraulic diameter is between 4 and 8.

In addition to one or more of the features described above, or as an alternative, further embodiments may include one or more bends in the fluid passage between the port inlet and the port outlet.

In addition to one or more of the features described above, or as an alternative, further embodiments may include that each bend has a bend radius between one and two times an inlet hydraulic diameter of the port inlet.

According to another embodiment, a combustor for a gas turbine engine is provided. The combustor includes a combustor case, a combustor liner disposed in the combustor case, radially offset from the combustor case to define an airflow pathway between the combustor case and the combustor liner, and an air extraction port. The air extraction port includes a port inlet at the combustor case of the combustor having an inlet area, a port outlet having a final area, and a fluid passage extending from the port inlet to the port outlet to convey an airflow, the port inlet sized and configured to extract the airflow from the combustor case at the same nominal upstream Mach number with a tolerance of +/−0.05.

In addition to one or more of the features described above, or as an alternative, further embodiments may include that the inlet area is greater than or equal to the final area.

In addition to one or more of the features described above, or as an alternative, further embodiments may include that a ratio of the inlet area to the final area is between 1.0 and 1.6.

In addition to one or more of the features described above, or as an alternative, further embodiments may include that a taper from the inlet area to the final area occurs over a passage length proportional to an inlet hydraulic diameter of the port inlet, wherein a ratio of the passage length to the inlet hydraulic diameter is equal to or greater than 4.

In addition to one or more of the features described above, or as an alternative, further embodiments may include that the ratio of the passage length to the inlet hydraulic diameter is between 4 and 8.

In addition to one or more of the features described above, or as an alternative, further embodiments may include one or more bends in the fluid passage between the port inlet and the port outlet.

In addition to one or more of the features described above, or as an alternative, further embodiments may include that each bend has a bend radius between one and two times an inlet hydraulic diameter of the port inlet.

According to another embodiment, a gas turbine engine is provided. The gas turbine engine includes a turbine and a combustor operably connected to the turbine, the combustor driving the turbine via combustion products of the combustor. The combustor includes a combustor case, a combustor liner disposed in the combustor case, radially offset from the combustor case to define an airflow pathway between the combustor case and the combustor liner, and an air extraction port. The air extraction port includes a port inlet at the combustor case of the combustor having an inlet area, a port outlet having a final area, and a fluid passage extending from the port inlet to the port outlet to convey an airflow, the port inlet sized and configured to extract the airflow from the combustor case at the same nominal upstream Mach number with a tolerance of +/−0.05, the airflow utilized to cool one or more turbine components.

In addition to one or more of the features described above, or as an alternative, further embodiments may include that a ratio of the inlet area to the final area is between 1.0 and 1.6.

In addition to one or more of the features described above, or as an alternative, further embodiments may include that a taper from the inlet area to the final area occurs over a passage length proportional to an inlet hydraulic diameter of the port inlet, wherein a ratio of the passage length to the inlet hydraulic diameter is equal to or greater than 4.

In addition to one or more of the features described above, or as an alternative, further embodiments may include that the ratio of the passage length to the inlet hydraulic diameter is between 4 and 8.

In addition to one or more of the features described above, or as an alternative, further embodiments may include one or more bends in the fluid passage between the port inlet and the port outlet.

In addition to one or more of the features described above, or as an alternative, further embodiments may include that each bend has a bend radius between one and two times an inlet hydraulic diameter of the port inlet.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
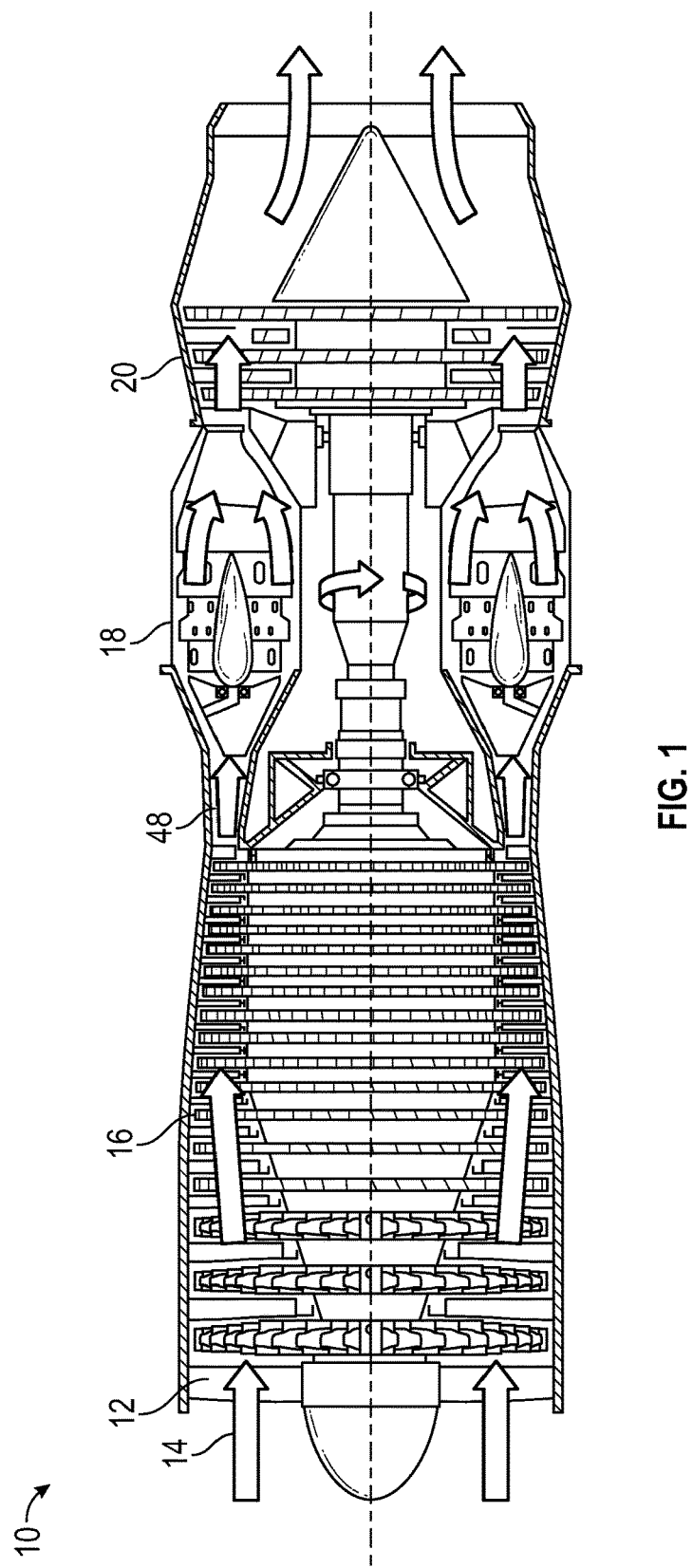
FIG. 1 is a schematic illustration of a gas turbine engine.

FIG. 1 is a schematic illustration of an exemplary gas turbine engine 10 capable of using features of the present disclosure. While a turbojet gas turbine engine 10 is illustrated, it is to be appreciated that the present disclosure may be utilized with other gas turbine engine configurations such as, but not limited to, turbo prop, turbo fan (geared or conventional), or industrial gas turbine engines. The gas turbine engine 10 generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10.

The gas turbine engine 10 may further comprise a low pressure compressor located in front of a high pressure compressor and a high pressure turbine located in front of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine. In some embodiments, a gear arrangement (not shown) connects the fan 12 and compressor 16 such that the fan 12 and compressor 16 are enabled to have different rotational speeds. In other embodiments, the gas turbine engine 10 may be a direct drive engine.

Figure 2:
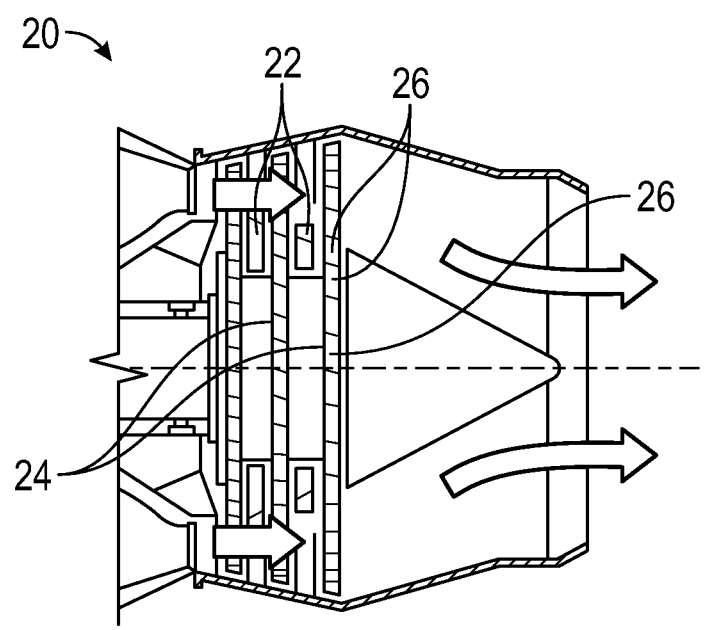
FIG. 2 is a cross-sectional view of an embodiment of a turbine for a gas turbine engine.

Referring to FIG. 2, the turbine 20 includes one or more sets, or stages, of fixed turbine vanes 22 and turbine rotors 24, each turbine rotor 24 including a plurality of turbine blades 26. The turbine vanes 22 and the turbine blades 26 utilize a cooling airflow to maintain the turbine components within a desired temperature range. In some embodiments, the cooling airflow may flow internal through the turbine components to cool the components internally, while in other embodiments, the cooling airflow is utilized to form a cooling film on exterior surfaces of the components.

Figure 3:
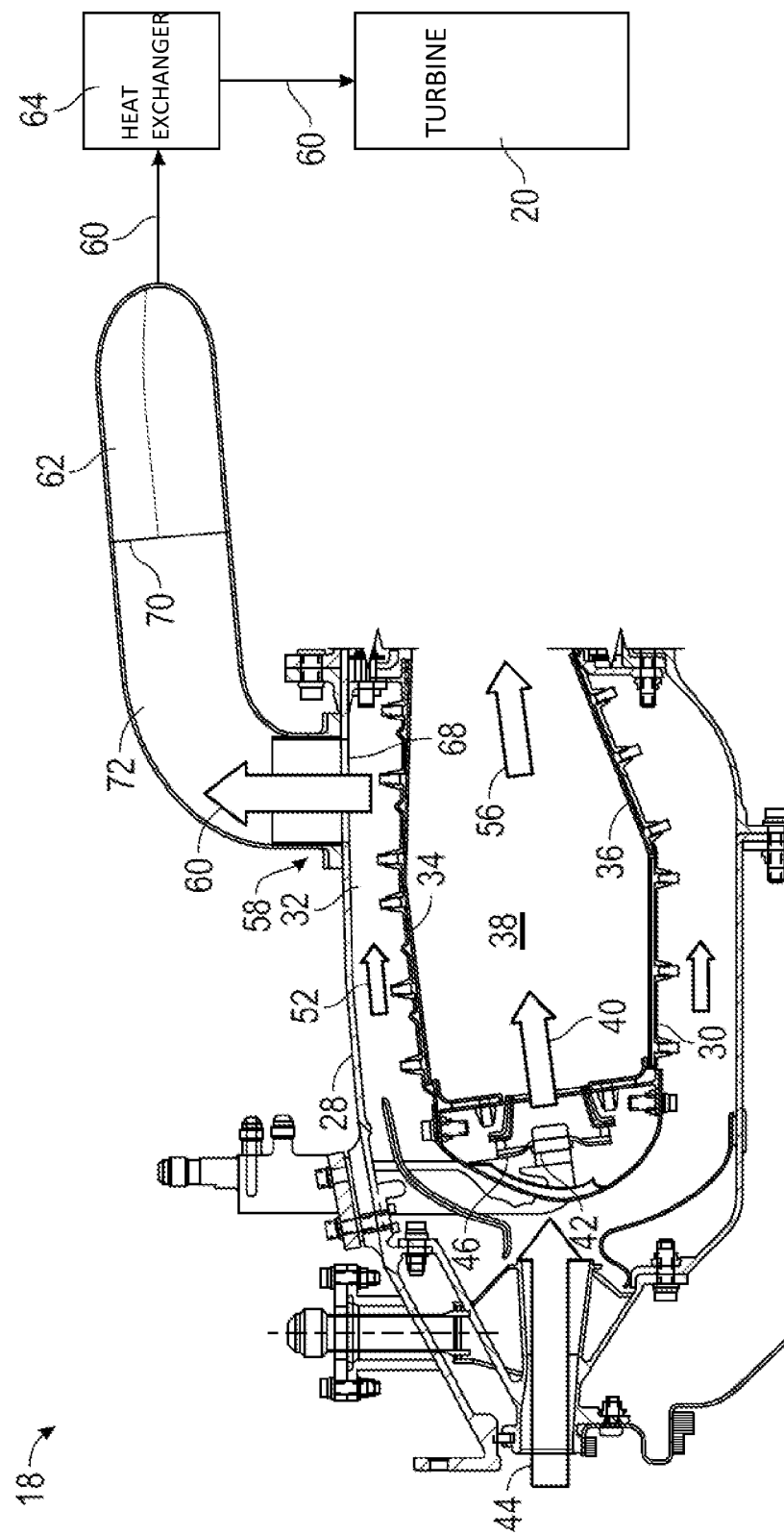
FIG. 3 is a cross-sectional view of a combustor for a gas turbine engine.

Shown in FIG. 3 is a schematic view of an exemplary combustor 18. The combustor 18 can have an annular structure including a combustor case 28 that houses a combustor liner 30. While an annular combustor 18 is illustrated, one skilled in the art will appreciated that the present disclosure may be applicable to other combustor configurations, such as can-annular combustors. The combustor liner 30 is offset from the combustor case 28 to define an outer airflow path 32 between the combustor liner 30 and the combustor case 28. The combustor liner 30 comprises an axially-extending outer wall 34 and an axially extending inner wall 36 that each extend circumferentially around the combustor 18. A radial offset between the outer wall 34 and the inner wall 36 defines a combustion zone 38 inside of the combustor liner 30 where a fuel and air mixture is combusted. A fuel flow 40 is delivered to the combustion zone 38 via one or more fuel injectors 42, while a primary airflow 44 is delivered to the combustion zone 38 through, for example, a swirler 46, which enhances mixing of the primary airflow 44 and the fuel flow 40 prior to combustion. An igniter (not shown) may be utilized to initiate combustion in the combustion zone 38. While a single combustion zone 38 is shown in FIG. 3, it is to be appreciated that multiple combustion zones 38 may be arranged circumferentially around the combustor 18.

The primary airflow 44 is received at the combustor 18 from the compressor via a diffuser 48 (shown in FIG. 1). Primary airflow 44 not flowed into the combustion zone 38 via the swirler 46 may be diverted into the outer airflow path 32 as a secondary airflow 52. At least a portion of the secondary airflow 52 is injected into the combustion zone to mix with combustion gases 56 as the combustion gases 56 flow toward the turbine 20. Since the secondary airflow 52 is lower in temperature than combustion gases 56 in the combustion zone 38, the addition of the secondary airflow 52 to the combustion gases 56 reduces the temperature of the combustion gases 56 to a selected temperature or selected temperature range.

The combustor 18 includes at least one air extraction port 58 extending from the combustor case 28. In some embodiments, a number of air extraction ports 58 are spaced around the combustor case 28. The air extraction ports 58 extract a portion of the secondary airflow 52 from the outer flow path 50 and divert the portion of the secondary airflow 52 to the turbine 20 to act as the cooling airflow 60 for the turbine components. In some embodiments, the cooling airflow 60 proceeds from a port inlet 68 of each of the air extraction ports 58 to a manifold 62 via a fluid passage 72 and a port outlet 70. The cooling airflow 60 proceeds through a heat exchanger 64 where the cooling airflow temperature 60 is cooled via thermal energy exchange with a heat exchange medium, such as an engine fuel supply. The cooling airflow 60 then proceeds to the turbine 20 to cool the turbine components 22, 26.

Figure 4:
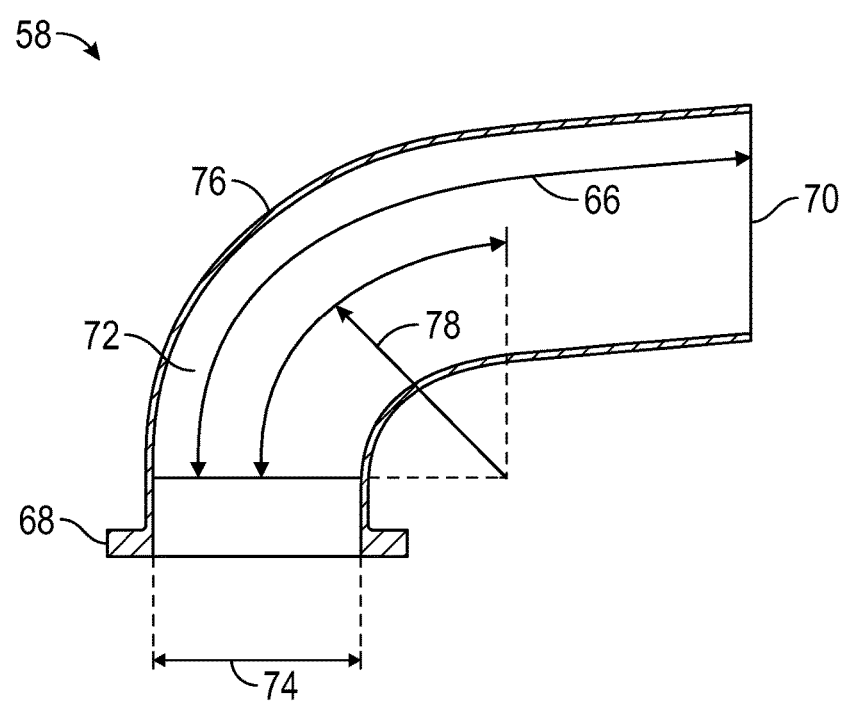
FIG. 4 is a cross-sectional view of an embodiment of an air extraction port at a combustor for a gas turbine engine.

Referring to FIG. 4, the air extraction ports 58 are specially constructed to reduce pertubations in the pressure distribution of the combustor 18 airflow, the combustion gases 56 and the secondary airflow 52. Each air extraction port 58 is sized such that the cooling airflow 60 extracted is at a local Mach number in a range of 0.00 and 0.10+/−0.05 and contracts along a port length 66 from the port inlet 68 to the port outlet 70 at the manifold 62. That is, as will be appreciated by those of skill in the art, the local Mach number may depend on the design of the combustor and surrounding components, and is, for example, based on the amount of airflow supplied upstream of the combustor. As used herein, a nominal local Mach number may be the Mach number at a particular axial location along the length of the combustor (i.e., in the direction of the airflow), and may depend on the configuration of the combustor and surrounding components. The air extraction port 58 has a ratio of inlet area to final area of between about 1.0 to 1.6. The contraction from the inlet area to the final area occurs over the length 66 of the air extraction port 58 that is proportional to an inlet hydraulic diameter 74 of the air extraction port 58. In some embodiments, a ratio of the length 66 to the inlet hydraulic diameter 74 is equal to or greater than 4. In other embodiments, the ratio of the length 66 to the inlet hydraulic diameter 74 is equal to or greater than 4 and less than or equal to 8.

Further, the air extraction port 58 may include one or more bends 76 along the length 72. To prevent turbulence in the cooling airflow 60, the each bend 76 has a bend radius 78 proportional to the inlet hydraulic diameter 74. In some embodiments, a ratio of the bend radius 78 to the inlet hydraulic diameter 74 is between about 1 and about 2.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An air extraction port at a combustor of a gas turbine engine comprising:
a port inlet at a combustor case of the combustor, the port inlet having an inlet area;
a port outlet having a final area; and
a fluid passage extending from the port inlet to the port outlet to convey an airflow, the port inlet sized and configured to extract the airflow from the combustor case at a nominal local Mach number;
wherein the inlet area is greater than the final area; and
wherein a contraction from the inlet area to the final area occurs over a passage length proportional to an inlet hydraulic diameter of the port inlet, wherein a ratio of the passage length to the inlet hydraulic diameter is equal to or greater than 4.

2. The air extraction port of claim 1, wherein a ratio of the inlet area to the final area is greater than 1.0 and less than or equal to 1.6.

3. The air extraction port of claim 1, wherein the ratio of the passage length to the inlet hydraulic diameter is between 4 and 8.

4. The air extraction port of claim 1, further comprising one or more bends in the fluid passage between the port inlet and the port outlet.

5. The air extraction port of claim 4, wherein each bend has a bend radius between one and two times an inlet hydraulic diameter of the port inlet.

6. A combustor for a gas turbine engine comprising:
a combustor case; and
a combustor liner disposed in the combustor case, radially offset from the combustor case to define an airflow pathway between the combustor case and the combustor liner; and
an air extraction port including:
a port inlet at the combustor case of the combustor, the port inlet having an inlet area;
a port outlet having a final area; and
a fluid passage extending from the port inlet to the port outlet to convey an airflow, the port inlet sized and configured to extract the airflow from the combustor case at a nominal local Mach number;
wherein the inlet area is greater than the final area; and
wherein a contraction from the inlet area to the final area occurs over a passage length proportional to an inlet hydraulic diameter of the port inlet, wherein a ratio of the passage length to the inlet hydraulic diameter is equal to or greater than 4.

7. The combustor of claim 6, wherein a ratio of the inlet area to the final area is greater than 1.0 and less than or equal to 1.6.

8. The combustor of claim 6, wherein the ratio of the passage length to the inlet hydraulic diameter is between 4 and 8.

9. The combustor of claim 6, further comprising one or more bends in the fluid passage between the port inlet and the port outlet.

10. The combustor of claim 9, wherein each bend has a bend radius between one and two times an inlet hydraulic diameter of the port inlet.

11. A gas turbine engine comprising:
a turbine; and
a combustor operably connected to the turbine, the combustor driving the turbine via combustion products of the combustor, the combustor including:
a combustor case; and
a combustor liner disposed in the combustor case, radially offset from the combustor case to define an airflow pathway between the combustor case and the combustor liner; and
an air extraction port including:
a port inlet at the combustor case of the combustor, the port inlet having an inlet area;
a port outlet having a final area; and
a fluid passage extending from the port inlet to the port outlet to convey an airflow, the port inlet sized and configured to extract the airflow from the combustor case at a nominal local Mach number, the airflow utilized to cool one or more turbine components;
wherein a ratio of the inlet area to the final area is greater than 1.0 and less than or equal to 1.6; and
wherein a contraction from the inlet area to the final area occurs over a passage length proportional to an inlet hydraulic diameter of the port inlet, wherein a ratio of the passage length to the inlet hydraulic diameter is equal to or greater than 4.

12. The gas turbine engine of claim 11, wherein the ratio of the passage length to the inlet hydraulic diameter is between 4 and 8.

13. The gas turbine engine of claim 11, further comprising one or more bends in the fluid passage between the port inlet and the port outlet.

14. The gas turbine engine of claim 13, wherein each bend has a bend radius between one and two times an inlet hydraulic diameter of the port inlet.

* * * * *